Oct. 16, 1951     R. G. WENSEL     2,571,981
HEADLIGHT CONTROL
Filed Sept. 3, 1948
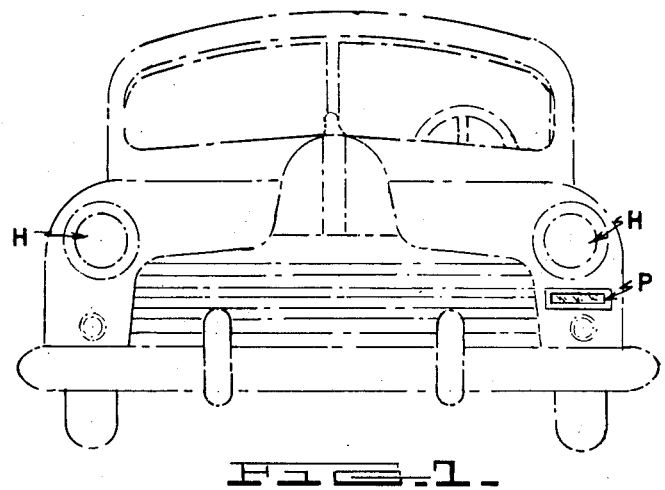
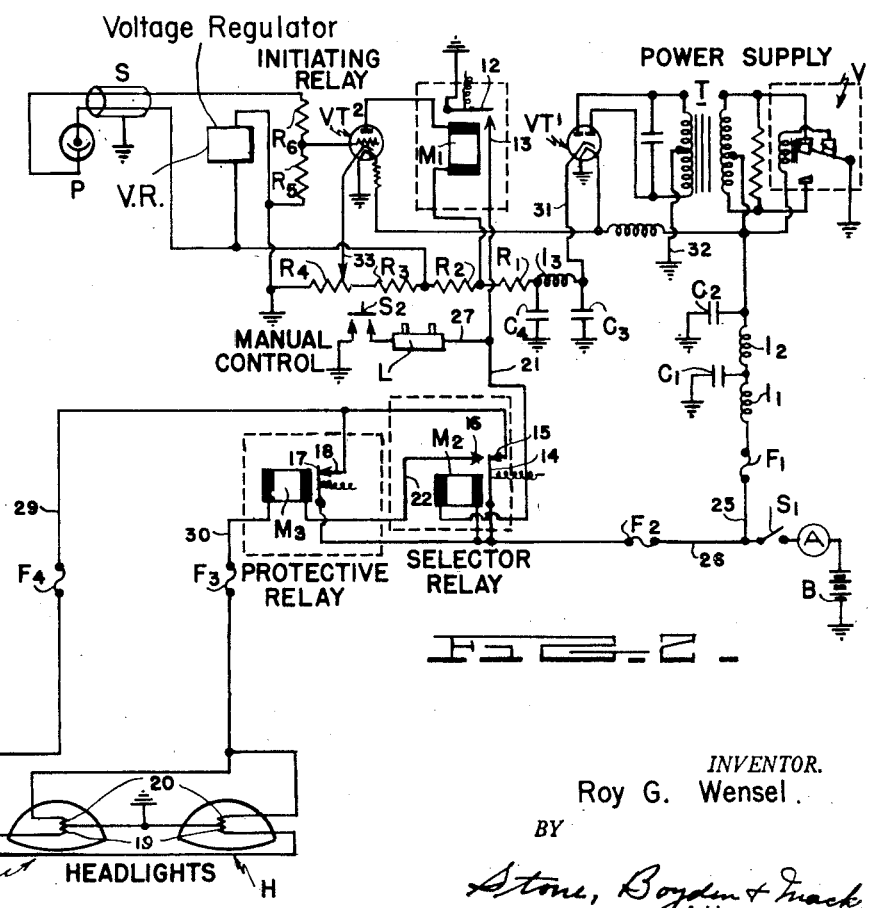
*INVENTOR.*
Roy G. Wensel.
BY
Stone, Boyden & Mack
Attorneys.

Patented Oct. 16, 1951

2,571,981

UNITED STATES PATENT OFFICE 2,571,981

HEADLIGHT CONTROL

Roy G. Wensel, Clarion, Pa.

Application September 3, 1948, Serial No. 47,643

6 Claims. (Cl. 315—83)

This invention relates to means for controlling the operation of the headlights of a motor vehicle which will enable the driver to concentrate his attention upon the operation of the vehicle without the distraction caused by the necessity of lowering the headlight beams manually with the approach of each oncoming car.

It is therefore an object of this invention to provide a device which eliminates one cause of highway accidents and eliminates human errors of judgment, by causing the headlight beams to be automatically lowered upon the approach of an oncoming vehicle.

It is another object of this invention, in addition to providing automatic control of the headlight beams of a motor vehicle, to permit the operator of a vehicle to control them manually if desired, this manual control being available instantly, in case of emergency, and without regard to the automatic means.

It is a further object of this invention to provide a device for automatically lowering the headlight beams of a motor vehicle in which there is provided a protective means which will prevent the lowering of the beams if, for any reason, there is an open circuit in the low beams.

Another object of the invention is to provide an automatic device for controlling the headlights of a motor vehicle which may be adjustably regulated to operate under predetermined conditions with respect to the approach of another vehicle, and which will respond uniformly with respect to these conditions.

Another object of the invention is to provide a motor vehicle headlight control system comprising an upper and lower beam in which, as long as one of the lighting circuits is operative, the vehicle will at all times be provided with illumination through one or the other of these circuits.

Still another object of this invention is to provide an automatic control system for motor vehicles having a power supply system which is properly filtered to prevent interference with the car radio set, is constructed with standard commercially available parts, and will permit manual operation of the lights in the event there is a failure on the part of any of the elements comprising the automatic system.

The device by which these objects may be accomplished is composed of several elements which include an initiating relay, a selector relay, and a protective relay. The initiating relay comprises a light-sensitive device, preferably mounted at the front end of the vehicle so as to be responsive to the lights of approaching vehicles, connected by appropriate means to an electrically operated switch, so that upon the approach of a vehicle the switch will be caused to operate, thus initiating a sequence of operations by other elements of the device. In operation, the filaments of the upper headlight beams are supplied with current from the vehicle battery through parallel circuits, one branch of which is through the selector relay, the other of which is through the protective relay. The effect of operation of the initiating relay is to cause the selector relay to transfer the current in its circuit from the upper beam filaments to a circuit including the lower beam filaments, causing them to be illuminated and at the same time to cause the protective relay to break its circuit from the battery to the upper beam filaments. If for any reason there is a break in the lower beam filament circuit the operation of the selector relay will be ineffective to cause the protective relay to break the existing circuit through it from the battery to the circuit including the upper beam filaments. Furthermore, if a break occurs in the lower beam circuit after it has been connected, the protective relay will act to restore current in the upper beam circuit. A manually operated switch is also provided, which is connected so as to operate the selector relay to cause the same sequence of operations to take place to shift the headlight beams regardless of the condition of the initiating relay.

The preferred embodiment of the invention is illustrated in the accompanying drawing, in which:

Figure 1 shows the location of the light sensitive device at the front end of a conventional motor vehicle; and Figure 2 is a wiring diagram of the lighting and control system of the invention.

Referring now in detail to the wiring diagram, shown in Figure 2, the usual storage battery of a motor vehicle is indicated by the reference character B. One side of this battery is connected to the ground, which in the case of a motor vehicle may be considered the metal framework of the car, and the other side leads to an ammeter, A. S1 indicates the main switch for the lighting system and may be mounted conveniently on the dashboard. From the main switch, there are led off two wires 25, and 26. The wire 25 is connected to the center tap of the primary winding of a power transformer T, through a conventional filter circuit composed of inductances I1, and I2, and capacitors C1, and C2. The primary of this transformer is also connected to a current interrupter of the vibrating reed type V in the usual fashion, and the secondary of the power transformer T feeds a full-wave rectifier VT1, of the thermionic tube type. The purpose of the power supply is to furnish direct current at relatively high potential to operate other elements of the device. One side of the power supply output leads from a center tap of the transformer secondary and is connected to the ground by the wire 32, while the high potential side of the output coming from the heater of the tube VT1 is led off by the wire 31. It will be noted that it makes no difference which terminal of the battery is grounded; the wire 31 will always supply current of a positive sign. The wire 31 connects the high potential side of the power supply through a filter circuit, composed of inductance I3 and capacitors C3, and C4, to series resistances R1, R2, R3, and R4 which are inserted in the circuit to regulate the potentials supplied respectively to the solenoid magnet M1, the light sensitive device P (which may be a suitable photo-electric cell), and the cathode of the thermionic tube VT2. The connection 33 between the cathode of VT2 and the resistance R4 is variable to permit adjustment of the cathode potential. The control element, of grid, of VT2 is connected to one side of resistances R5, and R6. The other side of resistance R5 is connected to the ground and to one side of a voltage regulating device VR of conventional design. The other side of the voltage regulator VR is connected to the high potential side of the light-sensitive device P. The low potential side of the device P is connected in series with the resistance R6 to the grid of the thermionic tube VT2. The device P is usually located at some point, such as the front fender of the vehicle, as shown in Figure 1, which is remote from the location of the rest of the elements of the control system so that it is desirable to surround the connecting wires with a grounded conduit S in order to preserve stability of operation. The efficiency of the light-sensitive device may also be improved by providing it with a reflector shaped so as to concentrate light from approaching vehicles.

The wire 26, leading from the switch S1, is connected to movable armatures 14, and 17, and to one side of the solenoid magnet M2, the other side of which is connected by the wire 21 to contact 13 which is associated with the movable armature 12, which is itself connected to the ground. The armature 12 is biased by a spring in an open position, but when current flows through the magnet M1, the armature closes the circuit to the contact 13. Associated with the movable armature 14 are two contacts 15, and 16, and this armature is spring-biased so as to connect with the contact 15 when no current is flowing in the magnet M2. When current does flow in the magnet M2, the armature 14 opens the circuit to contact 15 and closes the circuit to contact 16. The movable armature 17 is associated with contact 18, and is spring-biased to close the circuit through contact 18, except when current flows through the magnet M3 in which condition the circuit through contact 18 will be opened.

The headlights of the vehicle are indicated generally by the reference character H. These are preferably of the type which comprise two pre-focused filaments, one of which projects a high beam of light from a reflector, and the other a low beam. In Figure 2, the high beam filaments are designated by the reference numeral 19, and 20 indicates the low beam filaments. Both pairs of filaments are connected to a common ground. The ungrounded sides of the high beam filaments 19 are connected in parallel to the wire 29 which leads to contacts 15, and 18. The ungrounded sides of low beam filaments are similarly connected by wire 30 to one side of magnet M3, the other side of which is connected by the wire 22 to contact 16.

The manual control comprises the switch S2 which may be conveniently placed on the floor of the vehicle so that it may be operated by the driver's foot, when necessary. This switch is connected between the ground and the wire 21, in series with the conducting link L, and is normally biased in an open position. The description of the wiring diagram is completed by identification of F1, F2, F3, and F4 as fuses placed in suitable locations to obviate the possibility of fires which might result from short circuits.

The operation of the device will now be described. Assuming that the motor vehicle is being operated during the hours of darkness and on a stretch of highway when no cars are approaching; when the switch S1 is closed there will be no change in the position of the movable armatures 12, 14, and 17 and they will be in the positions shown in Figure 2. Current flowing through the wire 26, from the battery B, will go in parallel paths through armatures 14, and 17, and contacts 15, and 18 to the wire 29 which completes the circuit to the ground through the high beam filaments 19, which will thus be illuminated. Inasmuch as the armature 12 is in its open position no current will now be flowing in magnet M2. Current flowing from the battery through wire 25 into the power supply will cause the vibrator V to operate in the customary manner to supply an interrupted current to the primary of the transformer T which will induce an alternating current in the secondary at a higher voltage which will be rectified by VT1 and supplied to output connections 31, and 32. The various components of the initiating relay are selected so that under these conditions no current will flow between the plate and cathode of VT2, hence the magnet M1 will not be energized. However, with the approach of an oncoming vehicle, its headlights will react upon the light-sensitive device P, causing it to alter the potential impressed upon the control element of thermionic tube VT2 until the condition is reached where current flows in this tube between the cathode and plate. This current flow will in turn energize magnet M1 to move the armature 12 into contact with the contact 13. The closing of this contact immediately completes a circuit from the ground through the wire 21 and the magnet M2 to the ungrounded side of the battery B, thus energizing magnet M2.

As soon as the magnet M2 becomes energized it causes the armature 14 to break its contact with 15 and close its contact with 16. If, at this point, the low beam filaments 20 are not burned out, there will be a closed circuit from the battery, through wire 26, the armature 14, the contact 16, the wire 22, the magnet M3, the wire 30, and the low beam filaments 20 to the ground and back to the battery. When this circuit is completed the low beam filaments will be illuminated, and the current flowing through the magnet M3 will cause the armature 17 to open the circuit through the contact 18, at which time no current will flow through the high beam filaments 19.

As long as the light from the oncoming vehicle is impressed on the device P the circuit will remain in this condition, provided the low beam filaments are operative. When the approaching vehicle has passed, and light is no longer impressed on the device P, the potential on the control element of the tube VT2 will again revert to a value which prevents flow of current between the cathode and plate, thus de-energizing magnet M1, opening the circuit through contact 13, de-energizing the magnet M2, causing the armature 14 to open the circuit through contact 16, and closing it through contact 15 which will again establish the circuit from the battery B, the wire 26, the armature 14, the contact 15, the wire 29, and high beam filaments 19, returning to the battery through the ground. At the same time, the opening of the circuit between the armature 14, and the contact 16 has de-energized both the magnet M3 and the low beam filaments 20; de-energizing of the magnet M3 also permits the armature 17 to return to contact 18, re-establishing the parallel circuit between the wires 26 and 29.

Assuming now that there occurs for any reason a break in the circuit which includes the low beam filaments 20. When the light from an approaching vehicle is impressed upon the device P the magnets M1, and M2 will be energized as before. However, it is to be noted that when armature 14 moves from the contact 15 to contact 16, this breaks only one of two parallel circuits between the wires 26 and 29. At this instant the armature is still in contact with 18, and the high beam filaments will remain illuminated. The circuit to the high beam filaments through the armature 17, and contact 18, is broken only when the magnet M3 is energized, and in the situation where there is a break in the low beam filament circuit there will be no chance for the circuit through the magnet M3 to be completed. As long as magnet M3 remains de-energized, the high beam filaments will remain illuminated regardless of the operation of the initiating, and selector relays. This arrangement has been provided so that the driver will not find himself driving in darkness in the event of a failure of the low beam filaments.

There is a further possibility that while the low beam circuit may be in good condition when the device P first causes the closing of its circuit, there may be a failure of this circuit while it is in use. Assuming then that the circuit from the battery is through wire 26, armature 14, contact 16, wire 22, magnet M3, wire 30, and low beam filaments 20; if then there should occur a break in the circuit, such as if the filaments 20 burned out, the device would automatically shift the high beam filaments 19 back into the circuit. In this circumstance, at the instant the low beam filaments burned out the magnet M3 would be de-energized causing armature 17 to contact 18, restoring a circuit from the battery, wire 26, armature 17, contact 18, wire 29, and filaments 19. Note that in this case the device P is still under the influence of light from an approaching vehicle, and magnets M1 and M2 are still energized, and will remain so until the vehicle has passed, at which time the circuit between wires 26 and 29 through armature 14, and contact 15, would be restored.

A manual control is also provided, by means of which the driver may shift the current from the high beam filaments 19 to the low beam filaments 20 at will and without regard to the operation of the automatic devices comprising the initiating relay. The effect of closing the switch S2 is to complete a circuit between the wire 21, through the wire 27, the connecting link L and the ground, and produces the same results in the selector and protective relays as when the magnet M1 is energized by operation of the light sensitive device P. Thus, there is provided a manual control which enables the driver to lower the headlight beams at will, but which, if for any reason there is an open circuit in the lower beams, will not disconnect the high beams. The manual control will also be operable to shift the headlight beams in the event there is a failure in any part of the electronic system.

The resistance R4 being of the adjustable type, it is a further refinement of the invention that a suitable setting of the sliding contact 33 arranges for the initiating relay to operate when the effective intensity of the headlights of an approaching vehicle reaches a pre-determined value, within the limits of sensitivity of the device P. The headlights in use on the highways today being nearly uniform, regardless of the make of car, and in almost all cases being of the type which maintain their illumination value regardless of age, the result is that with proper setting of the resistance R4 it is possible to regulate the operation of this device so that it will lower the headlight beams at a fairly uniform distance from any approaching vehicle, thereby complying with state laws in this respect.

I claim:

1. An electric control system for a vehicle headlight having a pair of filaments comprising, a source of electrical energy, a first filament circuit, a second filament circuit including protective relay means, light sensitive electrical initiating relay means, electrical selector relay means, said selector relay means normally maintaining a connection between the source of electrical energy and said first filament circuit but when energized maintaining a connection between the source of electrical energy and said second filament circuit including said protective relay means, said protective relay means normally maintaining an additional connection between said source of electrical energy and said first filament circuit but when energized opening said additional connection, said protective relay means being connected in said second filament circuit so that if there is a failure in the circuit the protective relay will not be energized whereby said additional connection will be maintained, and means whereby said selector relay means will be energized in response to pre-determined changes in the condition of said light sensitive initiating relay.

2. An electric control system for a vehicle headlight having a pair of filaments comprising, a source of electrical energy, a first filament circuit, a second filament circuit including protective relay means connected in series with one of the filaments, electrical selector relay means, said selector relay means normally maintaining a connection between the source of electrical energy and said first filament circuit but when energized maintaining a connection between the source of electrical energy and said second filament circuit including said protective relay means, said protective relay means normally maintaining an additional connection between said source of electrical energy and said first filament circuit but when energized opening said additional connection, and means whereby said selector relay means may be energized, said protective relay means being energized to break said additional connection only so long as the second filament circuit is conductive.

3. An electric control system for a vehicle headlight having a pair of filaments comprising, a source of electrical energy, a first electromagnetic switch normally maintained in its open position, a second electromagnetic switch having first and second positions and being normally maintained in its first position, a third electromagnetic switch normally maintained in its closed position, a first filament circuit, a second filament circuit including the actuator coil of said third switch connected in series with one of said filaments, said second switch in its first position connecting said first filament circuit to said source of electrical energy and in its second position connecting said second filament circuit to said source of electrical energy, said third switch in its closed position forming an additional connection between said first filament circuit and said source of electrical energy, but when energized by the flow of current in said second filament circuit causing said additional connection to be opened, said first switch in its closed position connecting the source of electrical energy to the actuator coil of said second switch to cause said second switch to change to its second position, means including a light sensitive device to connect the actuator coil of said first switch to the source of electrical energy so as to close said switch in response to the existence of a predetermined condition of said light sensitive device.

4. An electric control system for a vehicle headlight having a pair of filaments comprising, a source of electrical energy, a first switch having an open and a closed position, a second switch having first and second positions and being normally maintained in its first position, a third switch normally maintained in its closed position, electromagnetic actuator coils for operating said second and third switches, a first filament circuit, a second filament circuit including the actuator coil of said third switch connected in series with one of said filaments, said second switch in its first position connecting said first filament circuit to said source of electrical energy and in its second position connecting said second filament circuit to said source of electrical energy, said third switch in its closed position forming an additional connection between said first filament circuit and said source of electrical energy but while its actuator coil is energized by the flow of current in said second filament circuit causes said additional connection to be opened, said first switch in its closed position connecting the source of electrical energy to the actuator coil of said second switch to cause said second switch to change to its second position.

5. An electric control system for a vehicle headlight having a pair of filaments comprising, a source of electrical energy, a first filament circuit, a second filament circuit including protective relay means, light sensitive electrical initiating relay means, electrical selector relay means, said selector relay means normally maintaining a connection between the source of electrical energy and said first filament circuit but when energized maintaining a connection between the source of electrical energy and said second filament circuit including said protective relay means, said protective relay means normally maintaining an additional connection between said source of electrical energy and said first filament circuit but when energized opening said additional connection, said protective relay means being connected in said second filament circuit so that if there is a failure in the circuit the protective relay will not be energized whereby said additional connection will be maintained, means whereby said selector relay means will be energized in response to pre-determined changes in the condition of said light sensitive initiating relay, and a manually operable switch connecting said selector relay means to the source of electrical energy for energizing the selector relay means independently of the operation of the initiating relay means.

6. An electric control system for a vehicle headlight having a pair of filaments comprising, a source of electrical energy, a first electromagnetic switch normally maintained in its open position, a second electromagnetic switch having first and second positions and being normally maintained in its first position, a third electromagnetic switch normally maintained in its closed position, a first filament circuit, a second filament circuit including the actuator coil of said third switch connected in series with one of said filaments, said second switch in its first position connecting said first filament circuit to said source of electrical energy and in its second position connecting said second filament circuit to said source of electrical energy, said third switch in its closed position forming an additional connection between said first filament circuit and said source of electrical energy, but when energized by the flow of current in said second filament circuit causing said additional connection to be opened, said first switch in its closed position connecting the source of electrical energy to the actuator coil of said second switch to cause said second switch to change to its second position, means including a light sensitive device to connect the actuator coil of said first switch to the source of electrical energy so as to close said switch in response to the existence of a predetermined condition of said light sensitive device, and a manually operable switch connecting the actuator coil of the second electromagnetic switch to the source of electrical energy for energizing said second electromagnetic switch independently of the operation of the first electromagnetic switch.

ROY G. WENSEL.

REFERENCES CITED

The following references are of record in the file of this patent:

UNITED STATES PATENTS

| Number | Name | Date |
| --- | --- | --- |
| 959,770 | MacDonald | May 31, 1910 |
| 2,150,900 | Alley | Mar. 21, 1939 |
| 2,380,486 | Willis, Jr. | July 31, 1945 |
| 2,427,076 | Tabacchi | Sept. 9, 1947 |

FOREIGN PATENTS

| Number | Country | Date |
| --- | --- | --- |
| 759,160 | France | Jan. 3, 1934 |